United States Patent
Bostick et al.

(10) Patent No.: US 9,811,256 B2
(45) Date of Patent: Nov. 7, 2017

(54) TOUCH SCREEN TACTILE GESTURES FOR DATA MANIPULATION

(71) Applicant: INTERNATIONAL BUSINESS MACHINES CORPORATION, Armonk, NY (US)

(72) Inventors: James E. Bostick, Cedar Park, TX (US); John M. Ganci, Jr., Cary, NC (US); Martin G. Keen, Cary, NC (US); Sarbajit K. Rakshit, Kolkata (IN); Kimberly G. Starks, Nashville, TN (US); Craig M. Trim, Sylmar, CA (US)

(73) Assignee: International Business Machines Corporation, Armonk, NY (US)

( * ) Notice: Subject to any disclaimer, the term of this patent is extended or adjusted under 35 U.S.C. 154(b) by 90 days.

(21) Appl. No.: 14/596,350

(22) Filed: Jan. 14, 2015

(65) Prior Publication Data
US 2016/0202898 A1    Jul. 14, 2016

(51) Int. Cl.
*G06F 3/0488* (2013.01)
*G06F 3/0482* (2013.01)
*G06F 11/30* (2006.01)
*G06F 17/30* (2006.01)

(52) U.S. Cl.
CPC ........ *G06F 3/04883* (2013.01); *G06F 3/0482* (2013.01); *G06F 11/30* (2013.01); *G06F 17/30572* (2013.01)

(58) Field of Classification Search
CPC .... G06F 3/04883; G06F 3/0482; G06F 11/30; G06F 17/30572
See application file for complete search history.

(56) References Cited

U.S. PATENT DOCUMENTS

| 8,436,821 | B1 | 5/2013 | Plichta et al. |
| 2011/0115814 | A1 | 5/2011 | Heimendinger et al. |
| 2011/0279384 | A1 | 11/2011 | Miller et al. |
| 2012/0180002 | A1* | 7/2012 | Campbell ............. G06F 17/246 715/863 |
| 2012/0229468 | A1 | 9/2012 | Lee et al. |
| 2012/0233003 | A1* | 9/2012 | Calman .................. G06Q 30/06 705/16 |
| 2012/0274583 | A1 | 11/2012 | Haggerty |
| 2012/0306745 | A1 | 12/2012 | Moore et al. |
| 2013/0254696 | A1 | 9/2013 | Cragun |
| 2013/0311916 | A1 | 11/2013 | Weng et al. |

(Continued)

OTHER PUBLICATIONS

P. Mell et al., "The NIST Definition of Cloud Computing", National Institute of Standards and Technology, Information Technology Laboratory, Version 15, Oct. 7, 2009, pp. 1-2.

(Continued)

*Primary Examiner* — Sahlu Okebato
(74) *Attorney, Agent, or Firm* — Law Office of Jim Boice

(57) ABSTRACT

A set of data is presented on a user interface, which is on a touch screen that is capable of detecting touch inputs. The set of data is initially in a first state. One or more processors detect a touch input from the touch screen. The touch input is a unique touch pattern that has been predefined as a user request to transform the set of data into a second state. The set of data is then displayed in the second state on the user interface.

14 Claims, 10 Drawing Sheets

(56) References Cited

U.S. PATENT DOCUMENTS

| | | | |
|---|---|---|---|
| 2014/0327608 A1* | 11/2014 | Tullis | G06Q 10/101 345/156 |
| 2015/0015504 A1* | 1/2015 | Lee | G06F 3/04845 345/173 |
| 2016/0055659 A1* | 2/2016 | Wilson | G06F 3/04842 715/771 |

OTHER PUBLICATIONS

M. Bennett et al., "SimpleFlow: Enhancing Gestural Interaction With Gesture Prediction, Abbreviation and Autocompletion", Interact'11, 2011, Part I, pp. 591-608, Springer-Verlag, Berlin, DE.

* cited by examiner

TOUCH SCREEN TACTILE GESTURES FOR DATA MANIPULATION

BACKGROUND

The present disclosure relates to the field of data manipulation, and specifically to transforming data from one state to another state. Still more specifically, the present disclosure relates to the use of tactile inputs to a touch screen to control the transformation of data from one state to another state.

SUMMARY

In an embodiment of the present invention, a processor-implemented method transforms and displays data. A set of data is presented on a user interface, which is on a touch screen that is capable of detecting touch inputs. The set of data is initially in a first state. One or more processors detect a touch input from the touch screen. The touch input is a unique touch pattern that has been predefined as a user request to transform the set of data into a second state. The set of data is then displayed in the second state on the user interface.

In an embodiment of the present invention, a computer program product transforms and displays data. The computer program product includes a computer readable storage medium that has program code embodied therewith. The computer readable storage medium is not a transitory signal per se. The program code is readable and executable by a processor to perform a method for transforming and displaying data. The method includes representing a set of data on a user interface. The user interface is on a touch screen that is capable of detecting touch inputs, and the set of data is initially in a first state. A touch input from the touch screen is detected. The touch input is a unique touch pattern that has been predefined as a user request to transform the set of data into a second state. The set of data is displayed in the second state on the user interface.

In an embodiment of the present invention, a system includes a touch screen display. The touch screen display presents a set of data on a user interface, and is capable of detecting touch inputs. The set of data is initially in a first state. One or more processors are coupled to the touch screen display, and detect a touch input from the touch screen. The touch input is a unique touch pattern that has been predefined as a user request to transform the set of data into a second state. A data transforming hardware device transforms the set of data into the second state. A video adapter device displays the set of data in the second state on the user interface.

DETAILED DESCRIPTION

Figure 1:
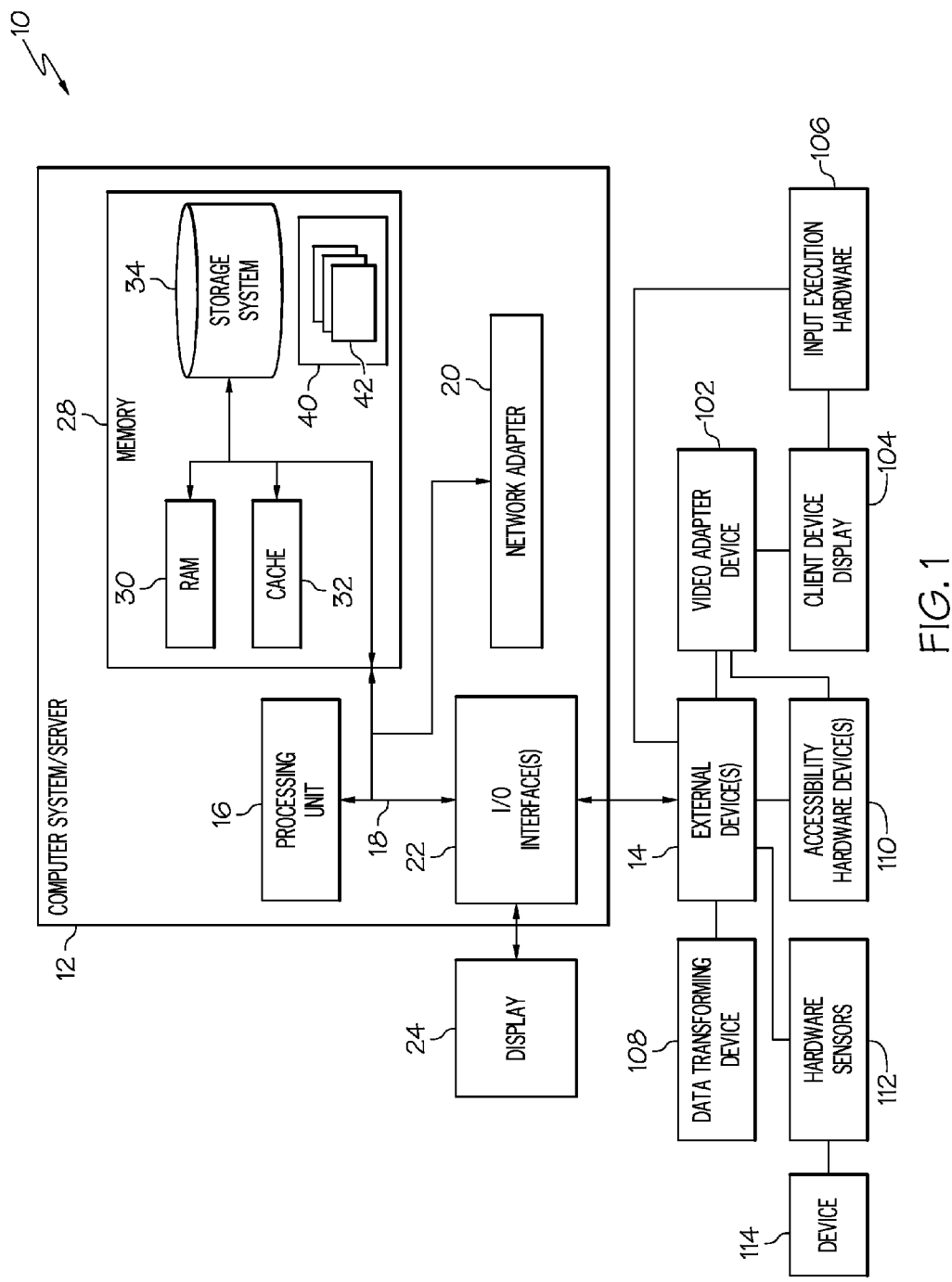
FIG. 1 depicts a cloud computing node according to an embodiment of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In one embodiment, it is to be understood that in one or more embodiments, the present invention is capable of being implemented in a cloud computing environment.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, network bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

In one or more embodiments of the present invention, external device(s) 14 utilize the architecture of the computer system/server 12 shown in FIG. 1. In one or more embodiments of the present invention, one of the external device(s) 14 is a client computer that is served by a client server, which in one or more embodiments of the present invention is the computer system/server 12.

Figure 2:
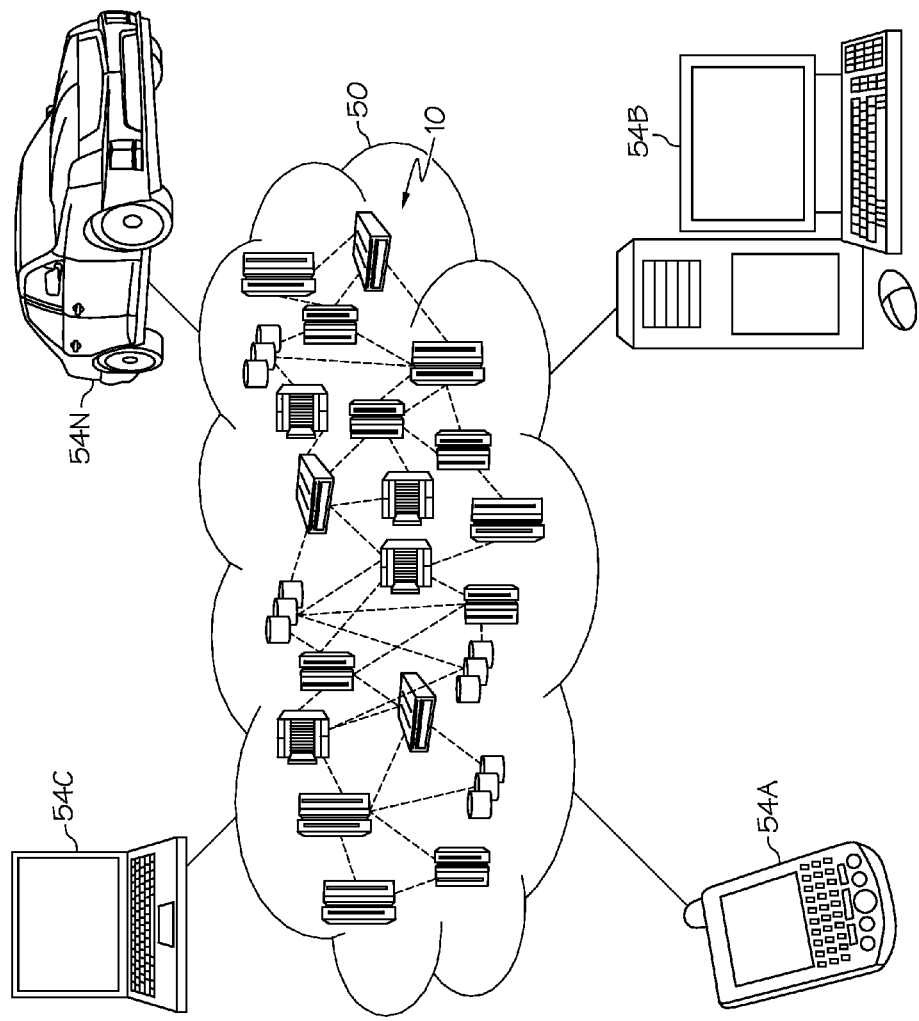
FIG. 2 illustrates a cloud computing environment according to an embodiment of the present invention.

Referring now to FIG. 2, an illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone MA, desktop computer MB, laptop computer 54C, and/or automobile computer system MN may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
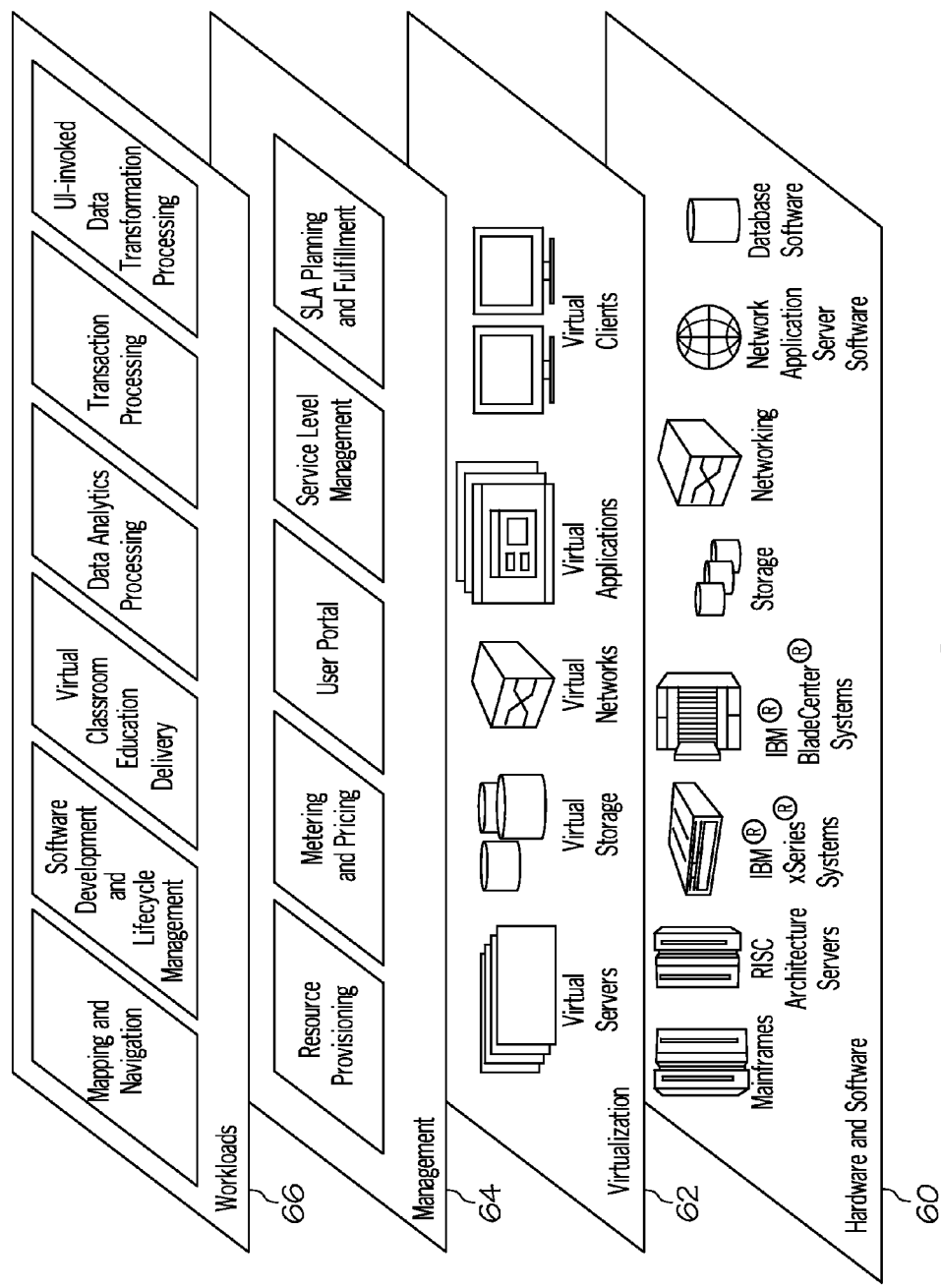
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide)

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below.

Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and transforming data based on user interface invoked signals, as described herein, and as represented by the "UI-invoked Data Transformation Processing" found in workloads layer 66.

Referring again to FIG. 1, assume that one of the external device(s) 14 is a client computer that is coupled (e.g., via a cloud network) to computer system/server 12. Coupled to this client computer (e.g., one of the external device(s) 14) is a video adapter 102, which generates signals to create images on a client device display 104. In one or more embodiments of the present invention, client device display 104 is a touch screen, which is able to receive tactile inputs by simply touching the touch screen. These tactile inputs are detected by one or more sensors, which may be heat-sensitive, pressure-sensitive, or may be an array of infrared transmitter/receiver pairs that detect when a user is touching a particular position on the touch screen by detecting a break in the infrared signal.

Another component of the client computer (i.e., one of the external device(s) 14) is an input execution hardware 106. In one or more embodiments of the present invention, input execution hardware 106 is specially configured circuitry (e.g., an application specific integrated circuit—ASIC) that is dedicated to receiving and interpreting tactile inputs from the client device display 104. In one or more embodiments of the present invention, input execution hardware 106 is not a processor, and thus 1) does not consume the energy and bandwidth that a programmed processor would consume; 2) is faster than a processor executing instruction; and 3) thus improves the speed and efficiency in which the client device operates.

Another component of the client computer (i.e., one of the external device(s) 14) is a data transforming device 108. In one or more embodiments of the present invention, data transforming device 108 is specially configured circuitry (e.g., an application specific integrated circuit—ASIC) that is dedicated to converting data from a first state to a second state, as described herein. In one or more embodiments of the present invention, data transforming device 108 is not a processor, and thus 1) does not consume the energy and bandwidth that a programmed processor would consume; 2) is faster than a processor executing instruction; and 3) thus improves the speed and efficiency at which the client device operates.

Another component of the client computer (i.e., one of the external device(s) 14) is an accessibility hardware device 110. In one or more embodiments of the present invention, accessibility hardware device 110 is specially configured circuitry (e.g., an application specific integrated circuit—ASIC) that is dedicated to interpreting tactile inputs from the client device display 104 as coming from a user with accessibility limitations. In one or more embodiments of the present invention, accessibility hardware device 110 is not a processor, and thus 1) does not consume the energy and bandwidth that a programmed processor would consume; 2) is faster than a processor executing instruction; and 3) thus improves the speed and efficiency at which the client device operates.

Figure 4:
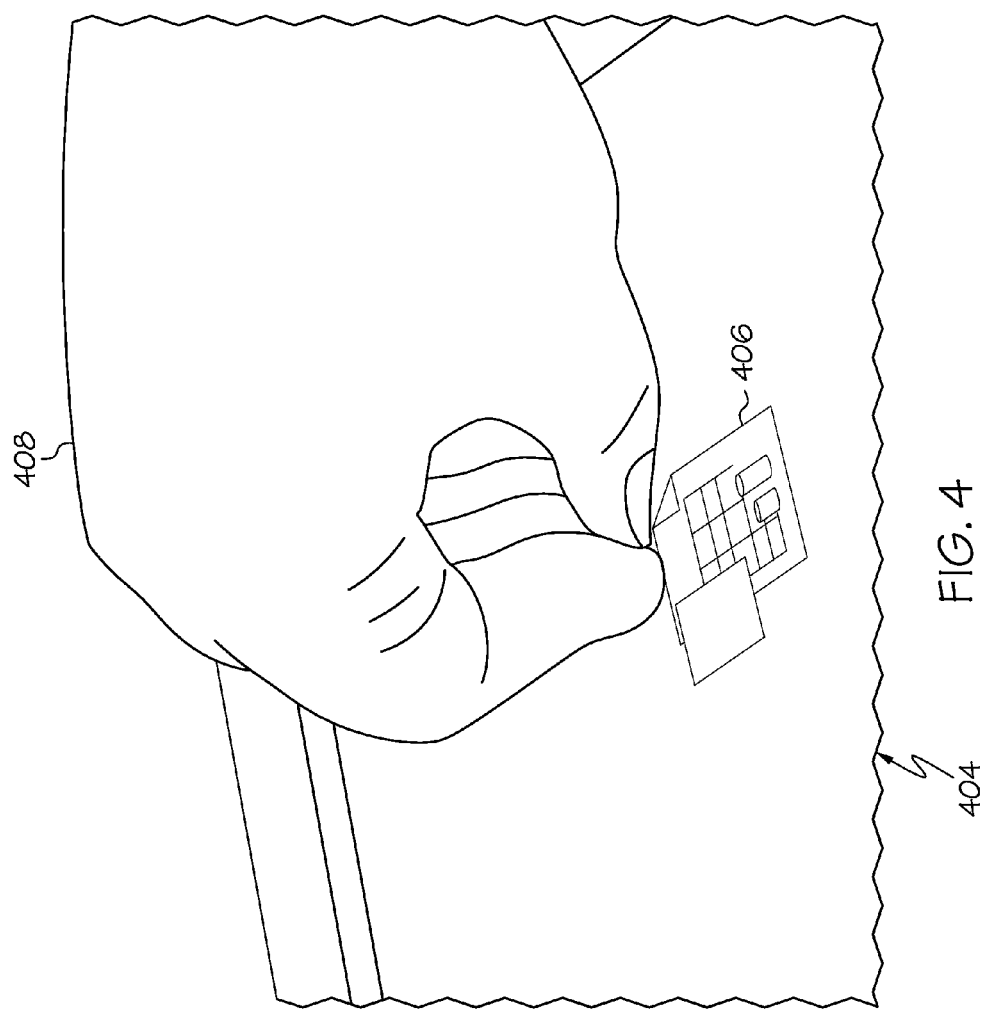
FIG. 4 and FIG. 5 illustrate exemplary tactile inputs to a touch screen to change data from a first state to a second state.

With reference now to FIG. 4, an exemplary touch screen 404 (analogous to the client device display 104 shown in FIG. 1) is depicted as having a user, who has selected a dataset 406 by placing multiple fingers 408 over the depicted icon that represents dataset 406. In one embodiment, the set of data (i.e., dataset) is actually depicted on the touch screen 404. For example, dataset 406 may be data found in a spreadsheet, which is depicted on the touch screen 404. In another embodiment, an icon representing the set of data is presented, as shown in FIG. 4.

Figure 5:
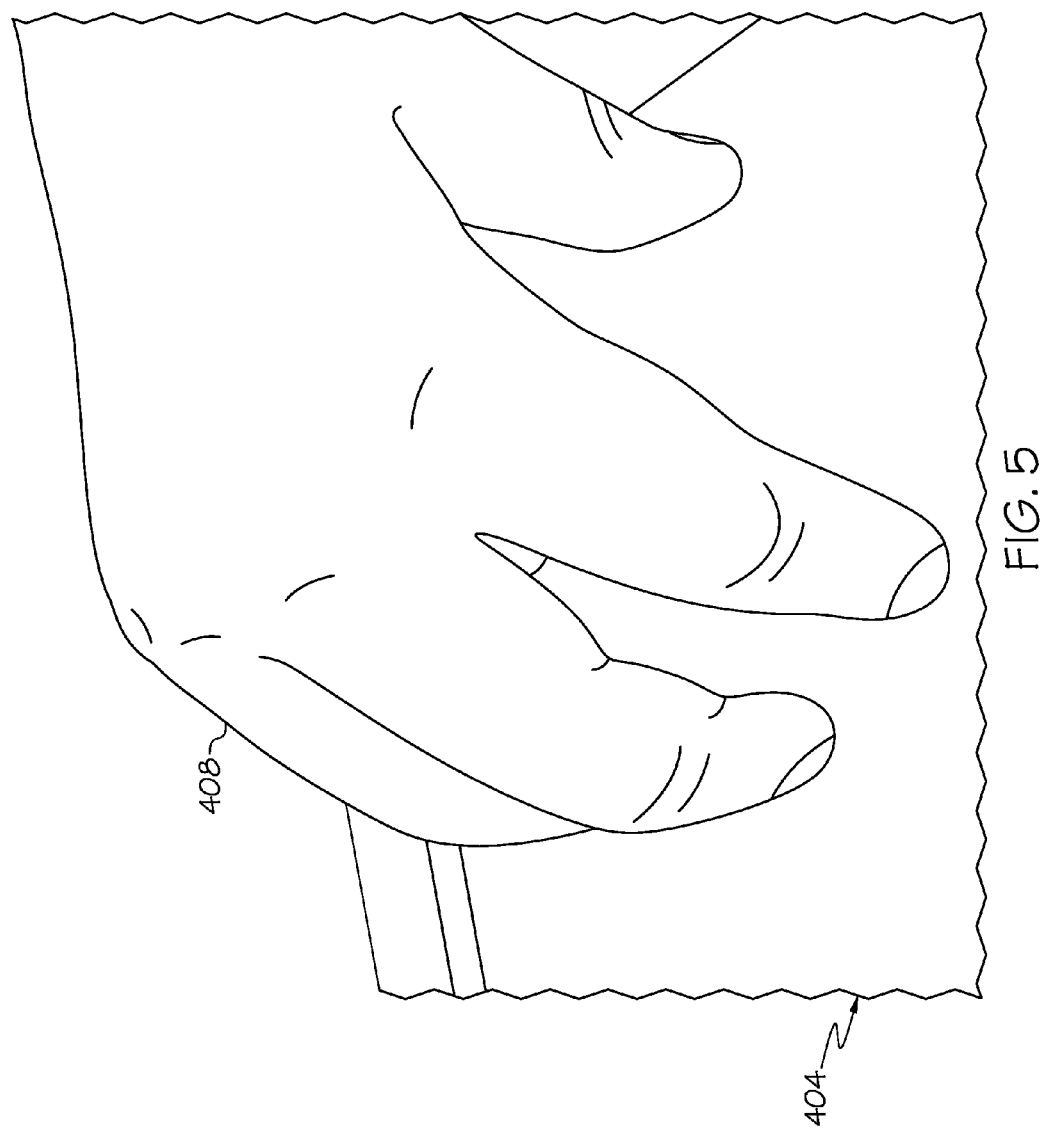

As shown in FIG. 5, the user has now splayed his/her fingers 408 away from each other while in contact with the touch screen 404, and in one or more embodiments, while his/her fingers 408 are positioned over the dataset 406 (and/or the icon that represents dataset 406). As described herein, a configurable definition of this finger movement indicates that the user wants to transform the dataset 406 from a first state into a second state. For example, the first state may be, but is not limited to, a table, spreadsheet, comma-separated value (CSV) file, etc. Exemplary second states of the dataset 406 include, but are not limited to, multiple data sets that have been broken out of the original dataset 406, cluster graphs, other graphical representations (e.g., bar graphs, line graphs, pie charts, etc.) of the dataset 406, merged datasets, results of an analysis of the dataset 406, etc.

Figure 6:
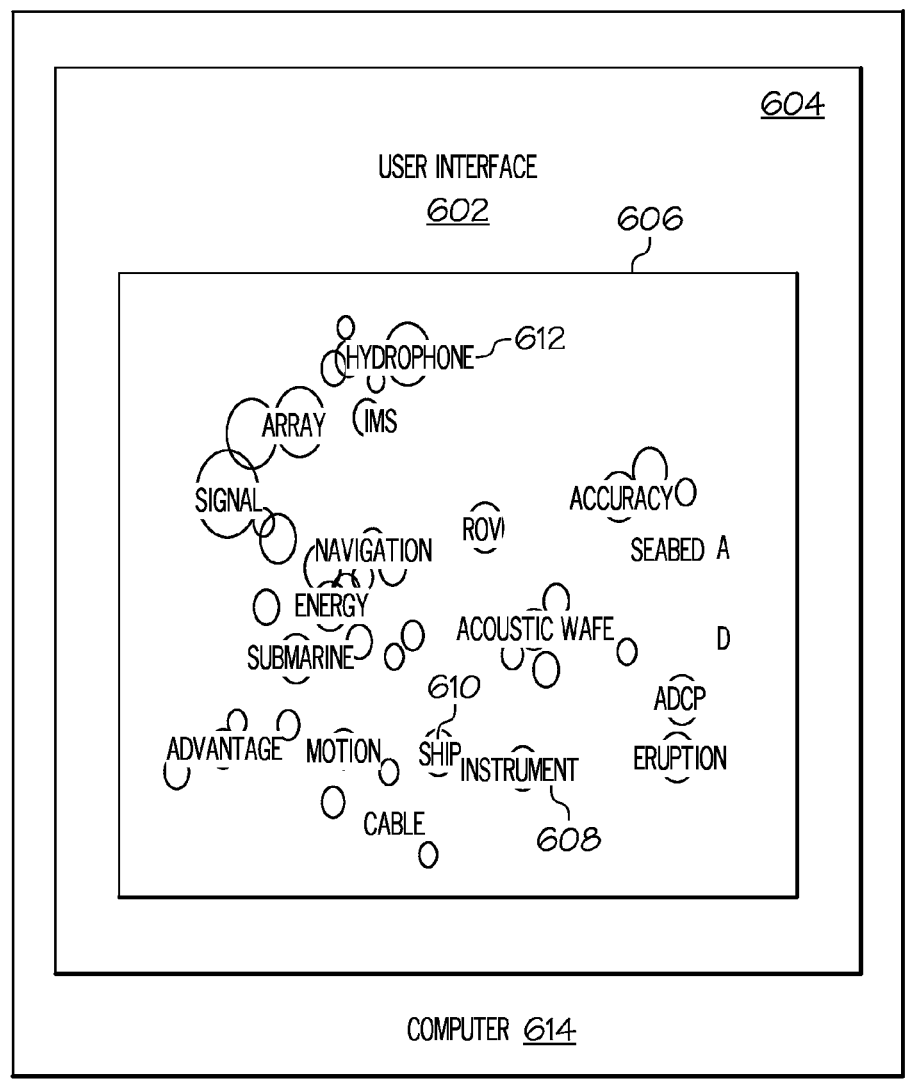
FIG. 6 depicts an exemplary second state of data in accordance with an embodiment of the present invention.

With reference now to FIG. 6, an exemplary second state of the database 406 shown in FIG. 4 is presented. Based on the finger gesture pattern of the fingers 408 shown in FIG. 5, one or more embodiments of the present invention identifies such finger splaying as indicating that the user wants to display the database 406 as a relational cluster graph 606, which is presented on a user interface 602 on the touch screen 604 (analogous to the client device display 104 in FIG. 1) of a client computer 614 (analogous to the client computer/external device(s) 14 in FIG. 1). The relational cluster graph 606 is made up of multiple data cluster icons, each of which represent a particular aspect (e.g., group, name, label, type, etc.) of the data from database 406. The size of the data cluster icons depicts how many data units from the database 406 are within a particular data cluster icon, while the positioning of the data cluster icons represents the relationship between the data represented by various data clusters/data cluster icons. For example, data cluster icon 608 may represent instrumentation data from various sources. Data cluster icon 610 is proximate to data cluster icon 608, thus indicating that the instrumentation data in data cluster icon 608 comes primarily from a ship that is represented by data in data cluster icon 610. While instrumentation data in data cluster icon 608 may also come from a hydrophone (represented by data cluster icon 612), relational cluster graph 606 indicates that little instrumentation data is coming from the hydrophone, due to the greater distance between data cluster icon 612 and data cluster icon 608.

Note that in one or more embodiments, a user can select one or more of the data clusters depicted by data cluster icons in the relational cluster graph 606 by tactile inputs, and can direct the system to perform various other actions on the data represented by a data cluster icon over which the new tactile inputs are applied. For example, the user can select any cluster (subset of the entire dataset), and then apply another tactile input over that cluster, thus causing the system to manipulate data from that cluster into a new state/analysis.

Thus, data that is represented in a particular cluster can further be manipulated. For example and in an embodiment of the present invention, clusters can be broken down into small sub-clusters using the same finger movement that was used to break the database 406 (e.g., a spreadsheet) into data clusters. That is, by using the same finger movement as described for FIG. 5, the system will recognize this finger movement as an "expansion" command, causing a data cluster represented in cluster graph 606 to be broken apart into smaller sub-clusters of data.

Alternatively, data clusters represented in cluster graph 606 can be combined. For example, consider FIG. 7, which depicts a user interface 702 on a touch screen 704 of a computer 714. Depicted on the user interface 702 are two of the data cluster icons shown in FIG. 6: data cluster icon 608 and data cluster icon 610. Assume now that a user wants to combine data represented by data cluster icon 608 (i.e., "cluster A") with data represented by data cluster icon 610 (i.e., "cluster B"). In order to accomplish this task, the user places his finger or other tactile device (e.g., a stylus or other inanimate device) onto the area on the touch screen 704 that is displaying cluster A. By moving his/her finger in the direction shown in FIG. 7, the data contents of cluster A are combined with cluster B by one or more processors, which interpret the movement of the tactile input and associate the underlying data represented by cluster A and cluster B together.

In various embodiments of the present invention, combining the data contents of cluster A with the data contents of cluster B has one or more consequences. In one embodiment, the data contents from cluster A and cluster B are now stored as a single data set in a data storage device (e.g., storage system 34 shown in FIG. 1, either as part of computer system/server 12 or as part of a client computer, depicted as one of the external device(s) 14 in FIG. 1). This improves the operation of the computer system(s) by allowing a single set of data to be accessed from a single memory address, rather than two memory addresses (e.g., one for the data from cluster A and one for the data from cluster B). This increases the speed at which data is retrieved by the computer system.

Figure 7:
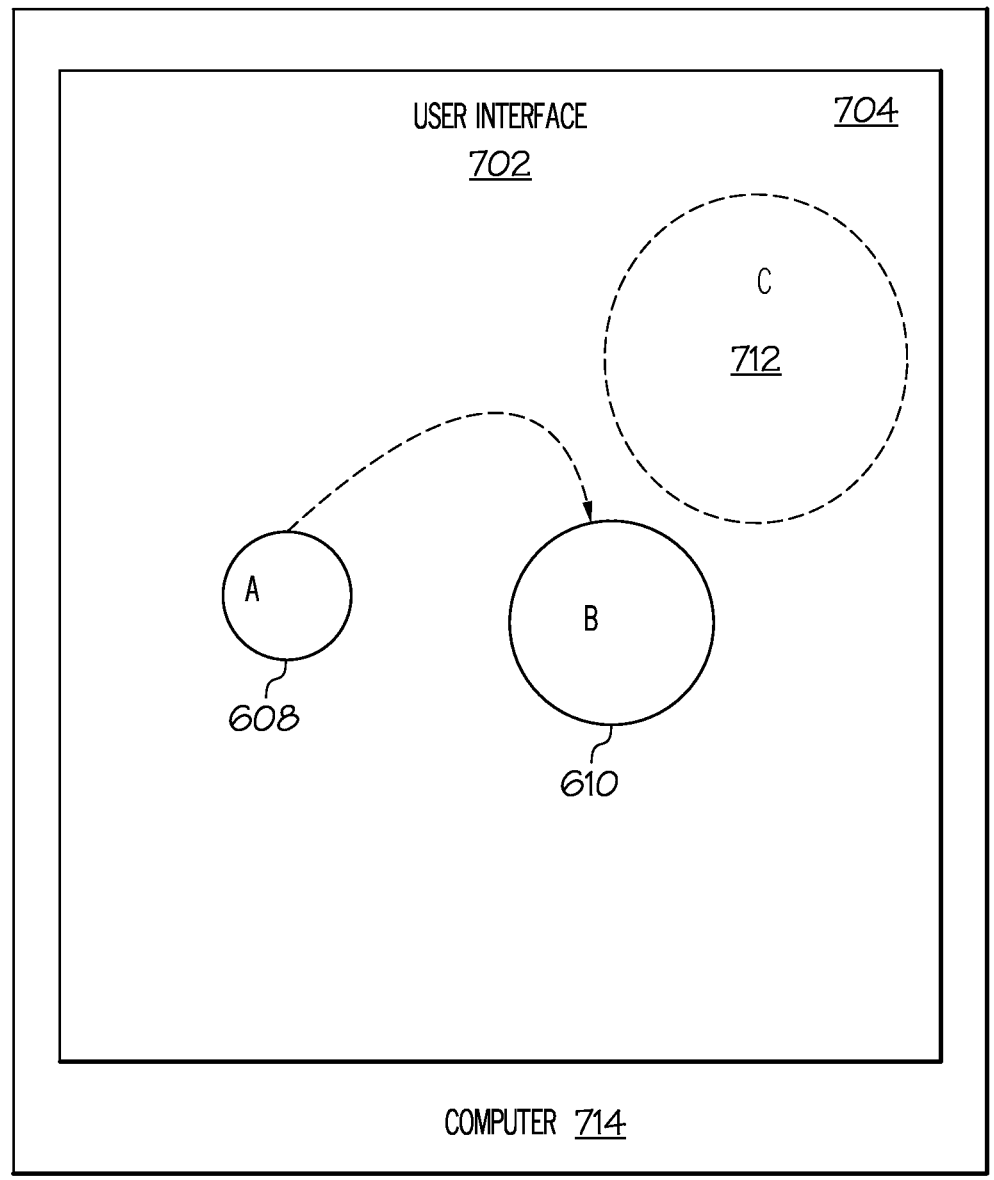
FIG. 7 illustrates another exemplary tactile input on a touch screen to combine two of the clusters of data shown in FIG. 6.

In one embodiment, the display of cluster A and cluster B is removed from the user interface 702, and is replaced by the display of a single data cluster C (data cluster icon 712 in FIG. 7). This allows the system to "clean up" a display of data clusters/data cluster icons, thus creating a more easily interpreted graph.

Figure 8:
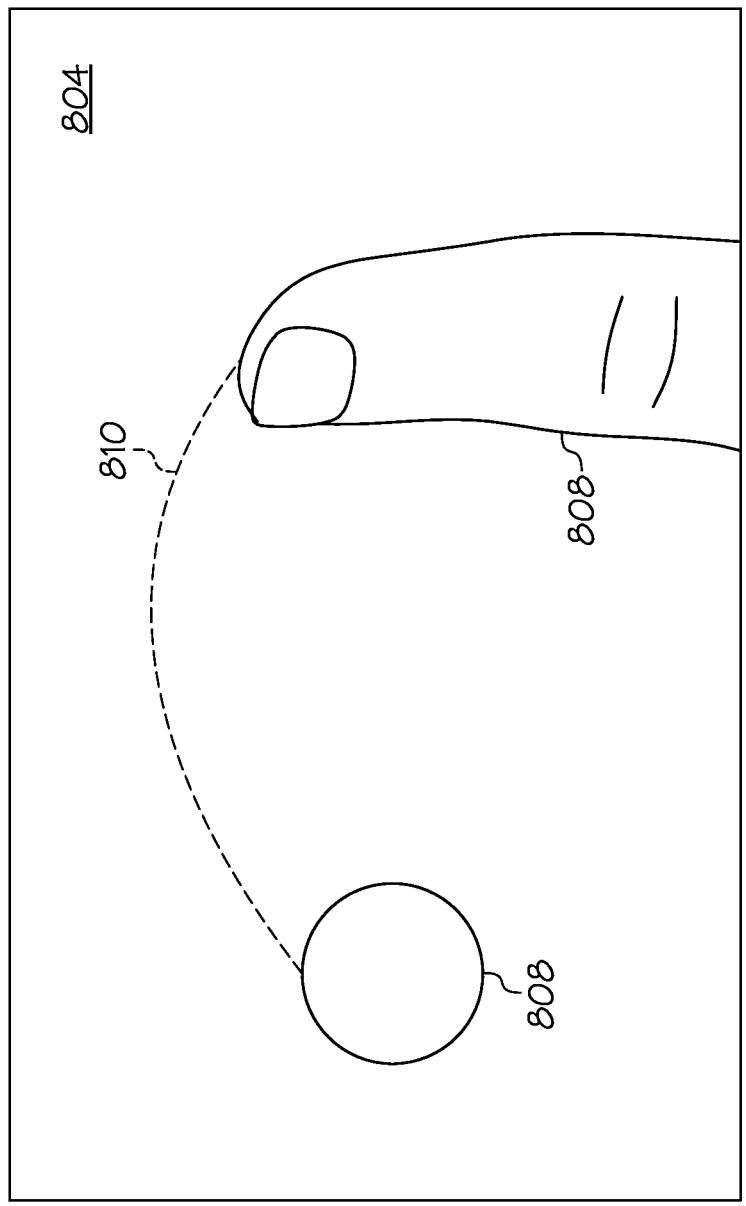
FIG. 8 and FIG. 9 depict a creation of a trend chart by finger movement across a dataset icon on a touch screen.

With reference now to FIG. 8, assume that a dataset is represented by a dataset icon 808 on touch screen 804. By placing his/her finger 808 on top of the dataset icon 808, and then executing a finger movement 810 in a predetermined manner (e.g., from left to right as depicted), the system (e.g., a client computer such as that described in FIG. 1) recognizes the user's finger movement as an instruction to generate a trend graph, such as the trend graph 902 depicted in FIG. 9. According to predetermined parameters and instructions, the trend graph 902 will depict one or more trends found in the data that is in the dataset represented by dataset icon 808. For example, the trend chart may show a time-based movement of values within the dataset, an average value of the data within the dataset (including average values over time, in response to various scenarios, etc.). In one embodiment of the present invention the trend graph 902 shows how data values within the dataset change in response to readings from various hardware devices.

For example, assume that hardware sensors (e.g., hardware sensors 112 in FIG. 1) measure parameters of certain devices, equipment, etc. For example, the hardware sensors 112 may be temperature probes that are coupled to a fluid pump, which is an exemplary device 114 shown in FIG. 1. Other hardware sensors from hardware sensors 112 may detect flow rate within the fluid pump. Thus, the trend graph 902 may use flow-rates as a scale for an X-axis in the trend graph 902, and temperature readings as a scale for a Y-axis in the trend graph 902. The trend graph 902 would therefore depict how temperature changes in the fluid pump as the flow-rate increases.

Other embodiments utilize other sensor readings from other types of hardware devices 114 (e.g., central processing units—CPUs, power generators, vehicular traffic sensors, etc.) to chart how one parameter (e.g., network bandwidth usage) is affected by another parameter (e.g., CPU demand) in a physical device 114.

Figure 10:
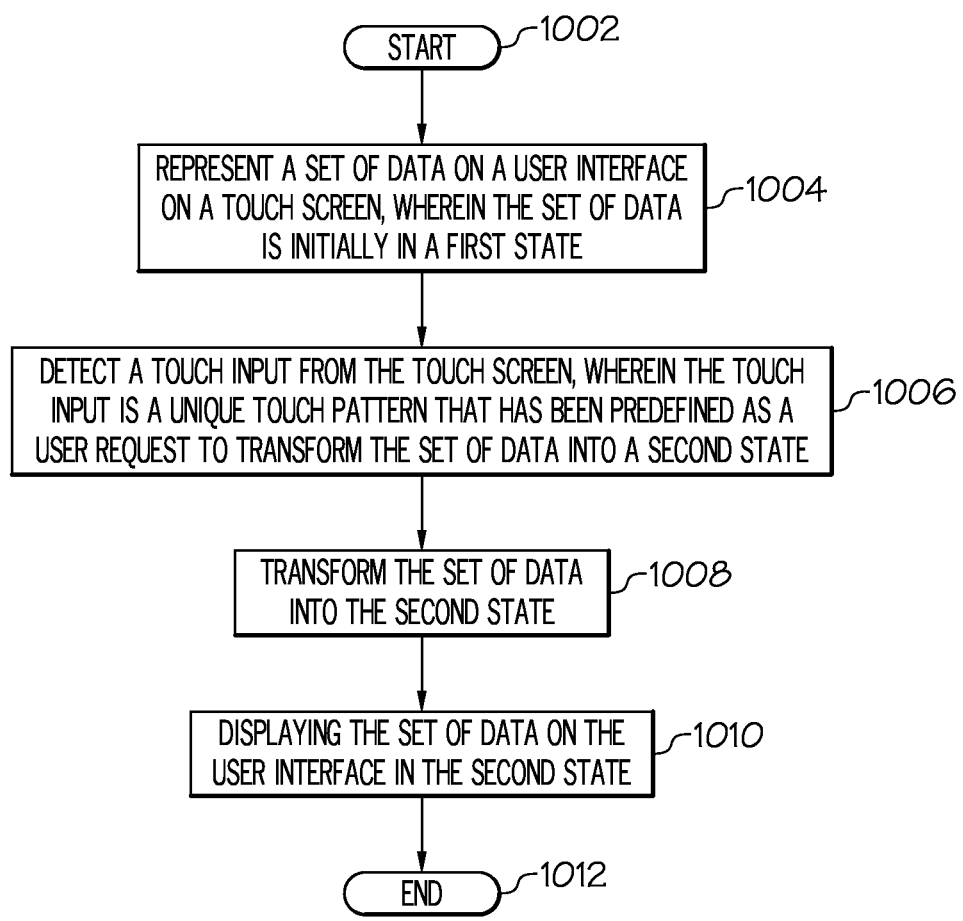
FIG. 10 is a high-level flowchart of one or more steps performed by one or more processors and/or other hardware devices to transform and display data on a user interface.

With reference now to FIG. 10, a high-level flowchart of one or more steps performed by one or more processors and/or other hardware devices to transform and display data on a user interface is presented.

After initiator block 1002, a set of data is represented on a user interface (block 1002). As described in one or more embodiments herein, the user interface is on a touch screen that is capable of detecting touch inputs. The set of data is initially in a first state, such as a spreadsheet, a table, etc.

As described in block 1006, one or more processors detect a touch input from the touch screen. The touch input is a unique touch pattern that has been predefined as a user request to transform the set of data into a second state. For example, one touch pattern may be a splaying of fingers that are touching a database icon, which the system interprets as an instruction to create a cluster graph from the table/spreadsheet that the database icon represents (see FIG. 4-FIG. 6). Another touch pattern may be "dragging" a first data cluster icon onto a second data cluster icon, which the system interprets as an instruction to combined the data that the two cluster icons represent. (see FIG. 7). Another touch pattern may be touching a data icon on the touch screen, and then simply moving the finger in an arcing pattern to the right, which the system interprets as an instruction to perform a trend analysis of the underlying data, and to generate/present the resulting graph on the user interface/touch screen (see FIG. 8 and FIG. 9).

Thus, as described in block 1008 of FIG. 10, an input execution hardware (e.g., input execution hardware 106 in FIG. 1) transforms the set of data into the second state. As described in block 1010 of FIG. 10, the user interface/touch screen then displays the (transformed) set of data in the second state. The flow chart ends at terminator block 1012.

In an embodiment of the present invention, the first state of the dataset is a table, the second state of the dataset is a cluster pattern, and the touch input is an expansion input (see FIG. 4-FIG. 6). In this embodiment, one or more processors execute the expansion input to convert the set of data from the table into the cluster pattern. As described herein, the cluster pattern represents relational clusters of data from the set of data. The newly-generated cluster pattern is then displayed on the user interface.

In an embodiment of the present invention, the cluster pattern just described includes a first cluster of data and a second cluster of data (see FIG. 7). In this embodiment, a consolidation touch input is received by one or more processors from the touch screen. In response to receiving the consolidation touch input from the touch screen, one or more processors combine the first cluster of data with the second cluster of data to generate a consolidated cluster. In one embodiment, the consolidated cluster and the first and second clusters remain on the display/touch screen/user interface. In another embodiment, however, the first cluster of data and the second cluster of data are removed from the touch screen, such that the consolidated cluster is displayed on the user interface without the first and second clusters of data. Note that the term "cluster", "cluster of data", "data cluster icon", and "data cluster" may be used interchangeably to describe a cluster icon that represents a cluster of data on a user interface. Similarly, the terms "set of data" and "dataset" are used interchangeably to describe a collection of data.

In an embodiment of the present invention, an accessibility hardware device (e.g., accessibility hardware device 110 in FIG. 1) detects a pattern in the touch input that indicates an accessibility limitation of a user of the user interface. For example, assume in FIG. 5 that the user's fingers 408 normally are splayed out in uniform directions and distances to indicate an instruction to create the cluster graph 606 shown in FIG. 6. However, the movement of the user's fingers 408 are not uniformly and broadly splayed apart, but rather indicate that all fingers move together as a single unit away from the user's thumb. The system may interpret this as the user having partial hand paralysis, and thus having difficulty typing. Thus, in response to detecting the accessibility limitation of the user, the second state in which the dataset is presented is modified to accommodate the accessibility limitation of the user. For example, rather than present a cluster graph with pop-ups and other features that are controlled by a mouse, the cluster graph may be presented with features that are better suited for a user with partial hand paralysis, such as touch areas that are of a coarser granularity (i.e., a user is able to enter a touch command on a larger area rather than a small area on the touch screen), automatic enabling of voice-activated commands, etc. Thus, if a user is deemed to have difficulty in touching the screen to create the tactile command on the touch screen (based on the altered finger movement just described), then a voice-command feature (which converts voice inputs to computer-interpretable commands) within the accessibility hardware device 110 will be activated.

In an embodiment of the present invention, the first state of the dataset is a table, the second state of the dataset is a pie chart, and the touch input is a charting input that directs the system to convert the table into a pie chart. In this embodiment, one or more processors execute the charting input to convert the set of data from the table into the pie chart, which represents data from the set of data. The pie chart is then displayed on the user interface.

In an embodiment of the present invention, the first state of the dataset is a table, the second state of the dataset is a line chart, and the touch input is a charting input that directs the system to convert the table into a line chart. In this embodiment, one or more processors execute the charting input to convert the set of data from the table into the line chart, which represents data from the set of data. The line chart is then displayed on the user interface.

In an embodiment of the present invention, the first state of the dataset is a table, and the touch input is a trend analysis input. In this embodiment, one or more processors execute (i.e., interpret as an instruction) the trend analysis input to generate a trend analysis of data from the table.

Figure 9:
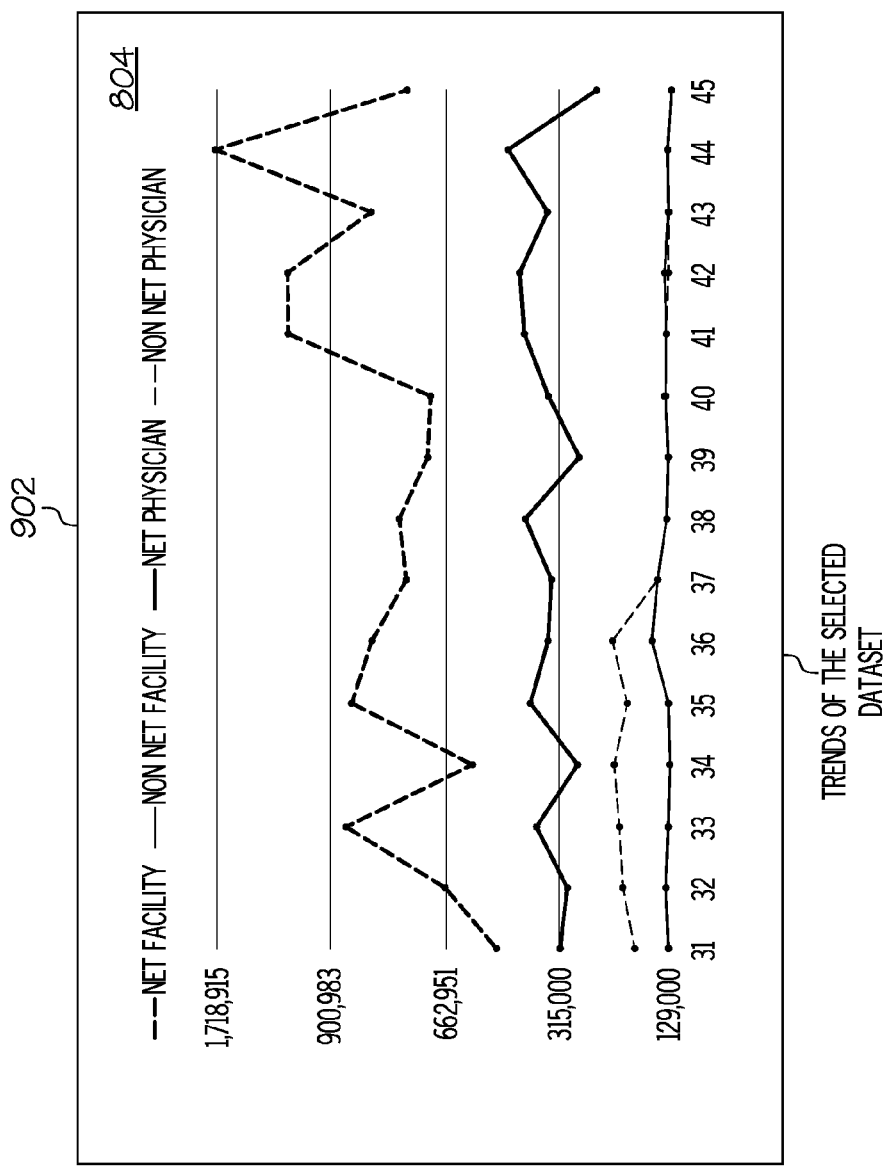

Results of the trend analysis of the data from the table on a chart are then presented on the user interface (see FIG. 9). In one embodiment, the table is removed from the user interface, such that only the chart is presented on the user interface.

In an embodiment of the present invention, the first state of the set of data is a consolidated form of the set of data, and the touch input is a data splitting input. In this embodiment, one or more processors execute the data splitting input to generate a first subset of the set of data and a second subset of the set of data from the consolidated form. That is, the consolidated form (e.g., a single large data cluster icon—see data cluster icon 712 in FIG. 7) is initially presented on a user interface. However, the user would like to split the data that makes up the dataset represented by data cluster icon 712 into smaller data clusters/data cluster icons. By placing his/her fingers of the consolidated data cluster icon 712 and then splaying them apart, data cluster icons representing the first subset of the set of data and the second subset of the set of data (e.g., as data cluster icon 608 and data cluster icon 610 shown in FIG. 7) are displayed on the user interface. In one embodiment, the consolidated form of the set of data (e.g., the consolidated data cluster icon 712 in FIG. 7) is removed from the user interface.

In an embodiment of the present invention, the set of data is represented on the touch screen as a representational icon, such as one or more of the data cluster icons described in FIG. 7. Similarly, the set of data may be represented as a more representative icon, such as the icon for dataset 406 depicted in FIG. 4, which indicates that the dataset is a spreadsheet.

In an embodiment of the present invention, the touch input is an expansion input. One or more processors detect the expansion input over a particular data cluster icon (e.g., the fingers and finger splay over the icon for a data cluster icon such as data cluster icon 608 in FIG. 6). One or more processors then execute the expansion input to generate a new cluster pattern, which represents relational clusters of data from the set of data that is represented by the original data cluster icon 608. The new cluster pattern is then displayed on the user interface.

The present invention thus provides a new, useful, and nonobvious improvement over the prior art. For example, consider again the embodiment presented and described in FIG. 7. The finger movement that is interpreted by the system is more than just simple touch input. For example, as a user's finger scans to the right, this could cause the system to generate a specific type of regression/trend analysis. Based on certain features that the system detects (motion, brevity, distance and force), the trend analysis could be completed across the entire dataset, or only a partial subset. The detection of features associated with a gesture form an aspect where the model is parameterized from the action. This goes beyond the simple touch input instructions known in the prior art in a new, useful, and nonobvious manner.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

Any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:

1. A processor-implemented method of transforming and displaying data, the processor-implemented method comprising:

representing a set of data on a user interface, wherein the user interface is on a touch screen that is capable of detecting touch inputs, wherein the set of data is initially in a first state, and wherein the first state is a table;

detecting, by one or more processors, a touch input from the touch screen, wherein the touch input is a unique touch pattern that has been predefined as a user request to transform the set of data into a second state, wherein the touch input is an expansion input, and wherein the second state is a cluster pattern;

detecting, by an accessibility hardware device, a pattern in the touch input that indicates an accessibility limitation of a user of the user interface;

transforming, by an input execution hardware, the set of data into the second state;

in response to detecting the accessibility limitation of the user, modifying, by one or more processors, the second state to accommodate the accessibility limitation of the user;

displaying, on the user interface, the set of data in the second state;

executing, by one or more processors, the expansion input to convert the set of data from the table into the cluster pattern, wherein the cluster pattern represents relational clusters of data from the set of data; and displaying the cluster pattern on the user interface, wherein the cluster pattern is depicted in a relational cluster graph that is made up of multiple data cluster icons, wherein each of the data cluster icons represent a particular aspect data from the set of data, wherein a size of each of the data cluster icons depicts how many data units from the set of data are within a particular data cluster icon, and wherein positioning of the data cluster icons represents a relationship between data represented by each of the multiple data icons.

2. The processor-implemented method of claim 1, wherein the cluster pattern comprises a first cluster of data and a second cluster of data, and wherein the processor-implemented method further comprises:
   receiving, by one or more processors, a consolidation touch input from the touch screen;
   in response to receiving the consolidation touch input from the touch screen, combining, by one or more processors, the first cluster of data with the second cluster of data to generate a consolidated cluster;
   removing, by one or more processors, a display of the first cluster of data and the second cluster of data from the user interface; and
   displaying, by one or more processors, the consolidated cluster on the user interface.

3. The processor-implemented method of claim 1, wherein the second state is also a pie chart, wherein the touch input is also a charting input, and wherein the processor-implemented method further comprises:
   executing, by one or more processors, the charting input to convert the set of data from the table into the pie chart, wherein the pie chart represents data from the set of data; and
   displaying the pie chart on the user interface.

4. The processor-implemented method of claim 1, wherein the second state is also a line chart, wherein the touch input is also a charting input, and wherein the processor-implemented method further comprises:
   executing, by one or more processors, the charting input to convert the set of data from the table into the line chart, wherein the line chart represents data from the set of data; and
   displaying the line chart on the user interface.

5. The processor-implemented method of claim 1, wherein the touch input is also a trend analysis input, and wherein the processor-implemented method further comprises:
   executing, by one or more processors, the trend analysis input to generate a trend analysis of data from the table;
   removing the table from the user interface; and
   presenting results of the trend analysis of the data from the table on a chart on the user interface.

6. The processor-implemented method of claim 1, wherein the first state is also a consolidated form of the set of data, wherein the touch input is also a data splitting input, and wherein the processor-implemented method further comprises:
   executing, by one or more processors, the data splitting input to generate a first subset of the set of data and a second subset of the set of data from the consolidated form;
   removing the consolidated form of the set of data from the user interface; and
   displaying the first subset of the set of data and the second subset of the set of data on the user interface.

7. The processor-implemented method of claim 1, further comprising:
   representing the set of data on the touch screen as a representational icon.

8. The processor-implemented method of claim 7, further comprising:
   detecting the expansion input over the representational icon;
   executing, by one or more processors, the expansion input to generate a cluster pattern, wherein the cluster pattern represents relational clusters of data from the set of data that is represented by the representational icon; and
   displaying the cluster pattern on the user interface.

9. A computer program product for transforming and displaying data, wherein said computer program product comprises a computer readable storage medium having program code embodied therewith, wherein said computer readable storage medium is not a transitory signal per se, and wherein said program code is readable and executable by a processor to perform a method comprising:
   representing a set of data on a user interface, wherein the user interface is on a touch screen that is capable of detecting touch inputs, wherein the set of data is represented on the touch screen as a representational icon, and wherein the set of data is initially in a first state, wherein the first state is a table;
   detecting a touch input from the touch screen, wherein the touch input is a unique touch pattern that has been predefined as a user request to transform the set of data into a second state, wherein the touch input is an expansion input that is detected over the representational icon and wherein the second state is a cluster pattern;
   transforming the set of data into the second state by executing the expansion input to generate a cluster pattern, wherein the cluster pattern represents relational clusters of data from the set of data that is represented by the representational icon;
   displaying the set of data in the second state as the cluster pattern on the user interface;
   executing the expansion input to convert the set of data from the table into the cluster pattern, wherein the cluster pattern represents relational clusters of data from the set of data; and
   displaying the cluster pattern on the user interface, wherein the cluster pattern is depicted in a relational cluster graph that is made up of multiple data cluster icons, wherein each of the data cluster icons represent a particular aspect data from the set of data, wherein a size of each of the data cluster icons depicts how many data units from the set of data are within a particular data cluster icon, and wherein positioning of the data cluster icons represents a relationship between data represented by each of the multiple data icons.

10. The computer program product of claim 9, wherein the cluster pattern comprises a first cluster of data and a second cluster of data, and wherein the method further comprises:
   receiving a consolidation touch input from the touch screen;
   in response to receiving the consolidation touch input from the touch screen, combining the first cluster of data with the second cluster of data to generate a consolidated cluster;
   removing a display of the first cluster of data and the second cluster of data from the user interface; and
   displaying the consolidated cluster on the user interface.

11. The computer program product of claim 9, wherein the method further comprises:
   detecting a pattern in the touch input that indicates an accessibility limitation of a user of the user interface; and in response to detecting the accessibility limitation of the user, modifying the second state to accommodate the accessibility limitation of the user.

12. A system comprising:

a touch screen display, wherein the touch screen display presents a set of data on a user interface, wherein the touch screen display is capable of detecting touch inputs, and wherein the set of data is initially in a first state, and wherein the first state is a table;

one or more processors coupled to the touch screen display, wherein the one or more processors detect a touch input from the touch screen display, wherein the touch input is a unique touch pattern that has been predefined as a user request to transform the set of data into a second state, wherein the touch input is an expansion input, and wherein the second state is a cluster pattern;

an accessibility hardware device for detecting a pattern in the touch input that indicates an accessibility limitation of a user of the user interface;

a data transforming hardware device for transforming the set of data into the second state;

the accessibility hardware device, in response to detecting the accessibility limitation of the user, modifying the second state to accommodate the accessibility limitation of the user;

an input execution hardware to execute the expansion input to convert the set of data from the table into the cluster pattern, wherein the cluster pattern represents relational clusters of data from the set of data; and a video adapter device to display the set of data in the second state on the user interface, wherein the cluster pattern is depicted in a relational cluster graph that is made up of multiple data cluster icons, wherein each of the data cluster icons represent a particular aspect data from the set of data, wherein a size of each of the data cluster icons depicts how many data units from the set of data are within a particular data cluster icon, wherein positioning of the data cluster icons represents a relationship between data represented by each of the multiple data icons.

13. The system of claim 12, wherein the cluster pattern comprises a first cluster of data and a second cluster of data, and wherein the system further comprises:

one or more processors for receiving a consolidation touch input from the touch screen display;

the input execution hardware for, in response to receiving the consolidation touch input from the touch screen display, combining the first cluster of data with the second cluster of data to generate a consolidated cluster;

the video adapter device removing a display of the first cluster of data and the second cluster of data from the user interface; and the video adapter device displaying the consolidated cluster on the user interface.

14. The system of claim 12, further comprising:

the video adapter device representing the set of data on the touch screen display as a representational icon;

the touch screen display detecting the expansion input over the representational icon;

the input execution hardware executing the expansion input to generate a cluster pattern, wherein the cluster pattern represents relational clusters of data from the set of data that is represented by the representational icon; and the video adapter device displaying the cluster pattern on the user interface.

* * * * *